(12) United States Patent
Halsberghe et al.

(10) Patent No.: US 6,984,042 B2
(45) Date of Patent: Jan. 10, 2006

(54) CONVERGENCE SYSTEM FOR A PROJECTION DISPLAY SYSTEM

(75) Inventors: Brecht Halsberghe, Kuurne (BE); Bart Van Den Bossche, Kuurne (BE); Cindy Van De Velde, Sint-Amandsberg (BE); Jan Leo Arteel, Kortrijk (BE)

(73) Assignee: Barco N.V., Kortrijk (BE)

( * ) Notice: Subject to any disclaimer, the term of this patent is extended or adjusted under 35 U.S.C. 154(b) by 0 days.

(21) Appl. No.: 10/785,355

(22) Filed: Feb. 24, 2004

(65) Prior Publication Data

US 2005/0185145 A1 Aug. 25, 2005

(51) Int. Cl.
*G03B 21/00* (2006.01)
*G03B 21/28* (2006.01)
*G02F 1/1335* (2006.01)

(52) U.S. Cl. .............................. 353/33; 353/81; 349/62; 349/7

(58) Field of Classification Search ................... 353/33, 353/20, 55, 56, 52, 81, 119; 349/7, 62
See application file for complete search history.

(56) References Cited

U.S. PATENT DOCUMENTS

| 6,056,407 | A | * | 5/2000 | Iinuma et al. | 353/119 |
| 6,819,464 | B2 | * | 11/2004 | Fujimori et al. | 359/246 |
| 6,830,338 | B2 | * | 12/2004 | Ogawa | 353/20 |
| 6,844,993 | B2 | * | 1/2005 | Fujimori et al. | 359/820 |
| 2004/0169784 | A1 | * | 9/2004 | Miyashita et al. | 349/58 |

* cited by examiner

*Primary Examiner*—Judy Nguyen
*Assistant Examiner*—Andrew Sever
(74) *Attorney, Agent, or Firm*—Barnes & Thornburg (57) ABSTRACT

A convergence system 100 comprises a dichroic prism 102 for splitting and/or recombining light beams, intermediate parts 104*a*, 104*b*, 104*c* and a light modulator 106*a*, 106*b*, 106*c* for every color beam. The intermediate parts 104*a*, 104*b*, 104*c* are constructed such that the convergence system has an improved resistance for variations in environmental effects like temperature and humidity. The intermediate parts 104*a*, 104*b*, 104*c* are constructed such that the convergence system has a high stability, a large degree of monolithicy and a high movement isotropy. When used in a projection display system, the projection display system has a high degree of color uniformity.

15 Claims, 7 Drawing Sheets

CONVERGENCE SYSTEM FOR A PROJECTION DISPLAY SYSTEM

TECHNICAL FIELD OF THE INVENTION

The present invention relates to a convergence system involving apparatus and methods for splitting and recombining color light beams in color projection systems. More specifically, a convergence system involving apparatus and methods for splitting, modulating and recombining of color light beams is described for producing high quality color images.

BACKGROUND OF THE INVENTION

Large-screen, high-brightness electronic projection display apparatuses serve different broad areas of application such as e.g. electronic presentations for business, education, advertising, entertainment, simulation and status and information.

Electronic projection display apparatuses can have several designs. One of the optical designs often used, comprises mirrors that split an incoming light beam, which typically is a white light beam, in three different colour beams, typically a red, green and blue color beam, modulates the different colour beams with a light modulating means for each of the three different colours, and recombines the three modulated light beams in a dichroic prism, like e.g. an x-cube, to form a single light beam to be projected on a screen. Such a setup is e.g. described in patent application U.S. Pat. No. 5,934,778. The system has some specific advantages, as the light paths between the color splitting/recombining means and the light modulating means can be very small, as the light modulating means typically are positioned adjacent the X-cube dichroic prism, in slits attached to the X-cube dichroic prism. Furthermore, also in some alternative designs wherein the X-cube dichroic prism is only used for color splitting or for color recombination, i.e. whereby the light modulating means are of the transmissive form, it is advantageous to position the light modulating means for each color adjacent to the color splitting/recombining means, e.g. in slits attached to the X-cube dichroic prism. The group of a dichroic prism combination such as an X-cube, possible additional filters and the light modulating means with their holders, typically is called a convergence system.

For today's systems, there is a trend towards smaller light modulating panels having at least the same resolution or towards light modulating panels having higher resolution. Whereas in previous systems the typical dimension (e.g. length of side) of a pixel in a light modulating means panel was of the order of 30 to 40 micrometer, in current or future systems the typical size required is about 13 to 10 micrometer. If the same imaging quality needs to be obtained, much better fixed convergence systems, stable over time, and not drifting due to mechanical reasons, thermal reasons or humidity are required.

A typical demand is that the total shift during use of the system, i.e. after the system has been used for a significant amount of time so that it is influenced by environmental parameters such as temperature and humidity, is restricted to maximum of half a pixel. This requirement is based on the fact that the amount of color shift during use of the system should be reduced as much as possible. During production, this demand is translated into the requirement that the different components, e.g. the light modulating means panel and the X-cube dichroic prism, should be positioned relative to each other with an accuracy of the order of less than 1 micrometer.

Besides an optimized accuracy for positioning the different components of the convergence system by the initial assembly, also attempts need to be made to reduce the influence of environmental factors on the convergence system. This can be done either by decreasing the effects of the environment by e.g. sealing the convergence system from environmental factors, or reducing the variations in environmental factors for the convergence system, or by optimising the convergence system and its assembly so that it is less sensitive to variations in environmental factors.

U.S. Pat. No. 5,988,818 describes a projection type display for separating white light into three primary colors, forming images with liquid crystal light valves, mixing these images and projecting an enlarged picture of the mixed image. The system, which does not use an X-cube but uses color filters and different light modulating panels positioned separately on a chassis, provides several means to reduce the sensitivity of the system for environmental parameters such as heat. Means for adjusting the position of the different light modulating means panels to correct for misalignment and thus color and pixel shift are provided. Furthermore, the chassis plates and the different fixing means and holders are made of the same material such as steel so that the relevant parts have the same coefficient of thermal expansion. Therefore the parts of the adjustment mechanism uniquely expand and shrink. U.S. Pat. No. 5,988,818 also provides optimized cooling means to reduce the thermal variations of the environment and the components, and thus to reduce their effect on color and or pixel shifts. The document does not describe means to reduce the effects of environment on a convergence system using an X-cube.

OCLI, Optical Coating Laboratory Inc. describes on its website (www.ocli.com) an image kernel that uses an X-cube dichroic prism and provides a mechanical structure for mounting LCOS panels which is rigid such that convergence of pixels is said to be improved and thermally induced image variations are said to be decreased. Part of the thermal stability is obtained as the light beam is split up into color subbeams by a number of separate dichroic filters and wire grid polarizers which reduce the amount of heat generated in the X-cube dichroic prism.

Nevertheless, none of the above systems describes a convergence system having an image quality that is practically insensitive to environmental factors due to an optimum construction and assembly of the convergence system.

SUMMARY OF THE INVENTION

It is an object of the present invention to provide a convergence system and method of operating the same having an improved construction and assembly leading to a smaller sensitivity to environmental factors.

The above objective is accomplished by a method and device according to the present invention.

The invention relates to a convergence system for a projection display system, that comprises a light splitting and/or light recombining means, a number of spatial light modulating means, and for each modulating means an intermediate part to connect said modulating means to a side of said light splitting and/or light recombining means. Each of the intermediate parts has an average expansion and reduction characteristic depending upon environmental influences which is similar to the average expansion and reduction characteristics depending upon environmental influences of at least one of the light splitting and/or recombining means and the light modulating means. In other words, the invention relates to a convergence system for a projection display system that comprises a light splitting and/or light recombining means, a number of spatial light modulating means, and for each light modulating means an intermediate part to connect the light modulating means to a side of the light splitting and/or light recombining means. Each of the intermediate parts is adjusted and fixed to make the convergence system act substantially monolithically and isotropically.

The convergence system may have a color misconvergence drift due to environmental effects which is less than 10 micrometers, preferably less than 5 micrometers more preferably less than 1 micrometer. The environmental influences are at least one of temperature, temperature gradient, humidity, stress and strain. The intermediate parts of the convergence system may have a linear thermal expansion coefficient which deviates less than $3.10^{-6}$/K, preferably less than $2.10^{-6}$/K, most preferably $1.10^{-6}$/K of at least one of the average linear thermal expansion coefficient of the light splitting and/or light recombining means or the average linear thermal expansion coefficient of the light modulating means. The intermediate parts of the convergence system may have a specific thermal conductivity which differs less than 100%, preferably less than 50%, more preferably less than 25% of at least one of the specific thermal conductivity of the light splitting and/or light recombining means, recombining means or the specific thermal conductivity of the light modulating means. The intermediate parts furthermore may have a high coefficient of elasticity. The high coefficient of elasticity may correspond to a Young's modulus of at least 50 GPa, preferably at least 140 GPa, more preferably at least 300 GPa. The intermediate parts may at least partly be constructed of ceramics. The intermediate parts may be for at least 50%, preferably for at least 80%, most preferably for at least 100% constructed of ceramics. The ceramics may be alumina $Al_2O_3$. In the convergence system, the intermediate parts furthermore may comprise straight, stiff bridges to connect the light splitting and/or light recombining means with the spatial light modulating means. Each of the intermediate parts may be adjusted for sideways receipt of analyzer means. The convergence system may have six degrees of freedom for converging the different parts of the convergence system. The convergence system may furthermore comprise connecting means to connect the intermediate parts with the light splitting and/or light recombining means and to connect the intermediate parts with the spatial light modulating means. The light splitting and/or light recombining means may be a dichroic prism, like e.g. an X-cube.

The light splitting and/or light recombining means may furthermore be adjusted to receive a light subbeam image from each set of spatial light modulating means and intermediate parts to form a converged image on a screen, the light splitting and/or light recombining means mirroring at least one of said light subbeam images, wherein at least one intermediate part has an asymmetric shape with respect to a direction perpendicular to an optical axis through the at least one intermediate part, and convergence of the subbeams after the light splitting and/or light recombining means before projection of the converged image on the screen is independent of perturbations in one or more environmental factors which affect the dimensions of the intermediate parts. The light splitting and/or light recombining means may furthermore be adjusted to receive a light subbeam image from each set of spatial light modulating means and intermediate parts to form a converged image on a screen, the light splitting and/or light recombining means mirroring at least one of said light subbeam images in a first direction, wherein each of the intermediate parts may have a shape having a mirror plane perpendicular to said first direction and wherein each of the intermediate parts may have a volume that differs less than 1%, preferably less than 0.1%, more preferably less than 0.01% and even more preferably less than 0.001% from the volume of each of the other intermediate parts. In other words, the intermediate parts may have an equal symmetrical shape, with a mirrorplane in or close to the middle of the active area of the light modulating means and having the same orientation as a mirror plane of the different colored images constituting the converged image on the screen. The position of the mirror plane may be such that if e.g. the image is mirrored left to right on the screen, then a vertical mirrorplane makes the symmetry plane in the intermediate parts whereas, if e.g. the image is mirrored top to bottom on the screen, then a horizontal mirrorplane makes the symmetry plane in the intermediate parts. The intermediate parts alternatively may have an asymmetrical shape, whereby some intermediate parts may be adjusted to have a mirrored asymmetrical shape to provide isotropic misconvergence for each set of light modulating means and intermediate parts. The light splitting and/or light recombining means may be adjusted to receive a light subbeam from each set of spatial light modulating means and intermediate parts, wherein the some intermediate parts are either all the intermediate parts sending a light subbeam to the light splitting and/or light recombining means that are subsequently mirrored an odd number of times by the light splitting and/or recombining means or all the intermediate parts sending a light subbeam to the light splitting and/or light recombining means that are subsequently not mirrored or mirrored an even number of times. The convergence system furthermore may be provided with a handling and guiding means.

The invention also relates to a projection display system comprising a convergence system as described above.

It is an advantage of the present invention that the convergence system behaves as monolithic in its construction.

It is another advantage of the convergence system that is highly isotropic.

Furthermore, it is a specific advantage of the present invention that the convergence system has a good resistance to thermal stress.

It is another advantage of the present invention that the convergence system is resistant to humidity.

Moreover, it is an advantage of the current invention that the convergence system suffers little or less from hysteresis.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and convergence systems for splitting, modulating and recombining color light beams.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Figure 1:
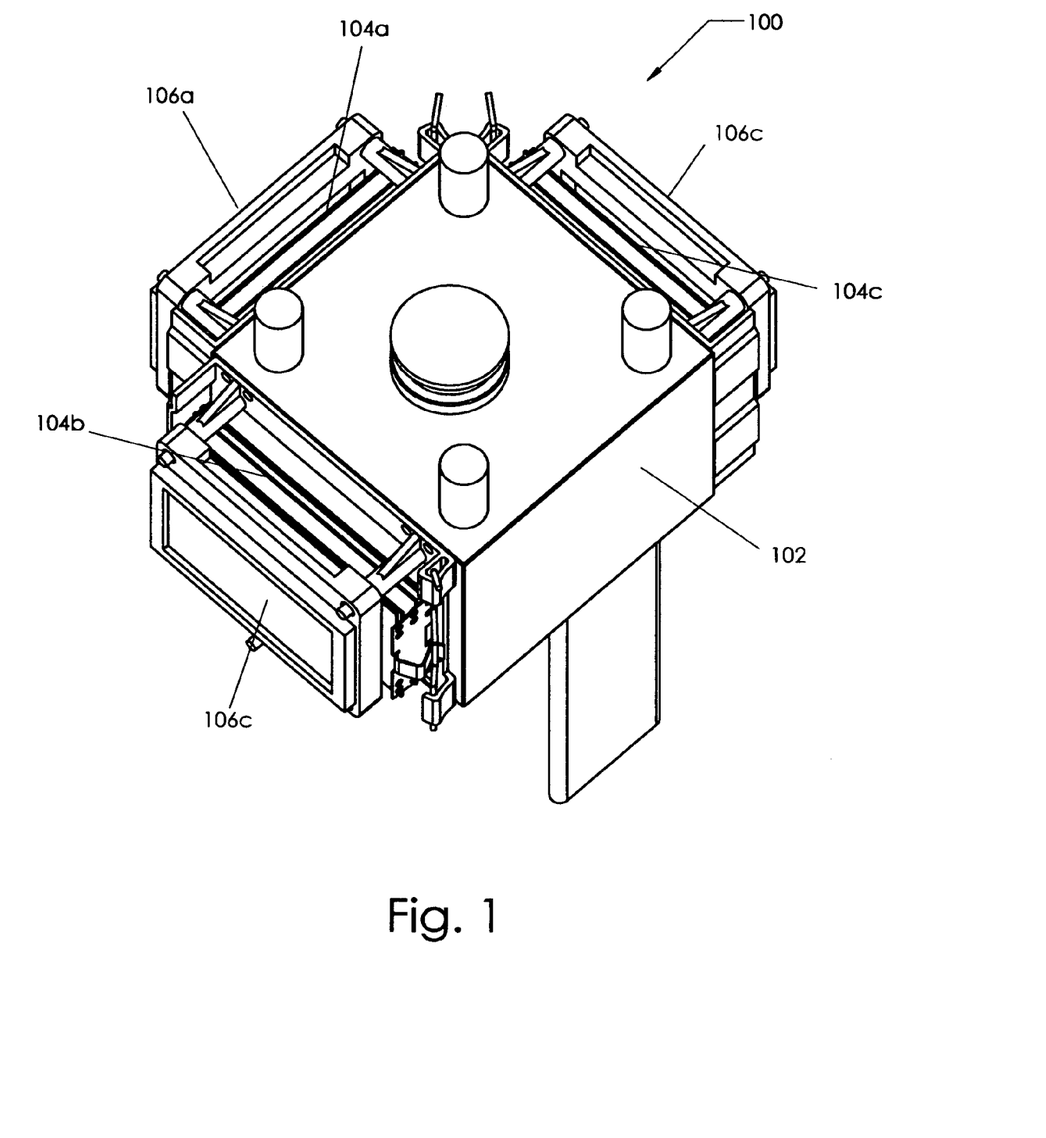
FIG. 1 shows an elevated top view of a convergence system according to a first embodiment of the present invention.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means. FIG. 1 shows a convergence system according to a first embodiment of the present invention. The convergence system 100 comprises an X-cube 102, three (or more) single intermediate parts 104a, 104b, 104c for three (or more) different colors or color ranges and light modulating means 106a, 106b, 106c for each of these three (or more) different colors. The X-cube 102 is a dichroic prism which allows recombination of three outgoing beams having a different color or color range into one beam. Some prisms however act as splitting and recombining mirrors at the same time, e.g. for reflective DMD's or reflective LCD's, such as LCOS-technology. In the splitting area of white light into its main color components, no image is created yet, convergence of images thus generally happens in the color recombining area. Typically, these colors correspond with the primary colours, i.e. green, red and blue. In the following, as an example color splitting and/or recombination will be described for three color subbeams which are green, red and blue, although the invention is not limited thereto. The X-cube 102 typically is made of glass preferably with optical quality, and comprises several dichroic coatings, which allow the recombination of three beams into an outgoing beam. BK7, which can be obtained from Schott Glas, is one of the most available optical glass types and therefore widely known, but other optical materials, produced by other companies such as Ohara and Corning, also are produced, each with their own specifications such as e.g. their own refractive Index. X-cubes made of another basic material are seldom but also could be used for the present invention. Complete X-cubes, i.e. the basic materials shaped to prisms, the applied coatings and the glue to connect the different parts made in the basic materials, are well known by a person skilled in the art and are available from e.g. Nitto Optical Co., Ltd. or Enplas Optics Corporation or Unaxis Balzers Ltd. Division Optics. Besides splitting of a single light beam, the X-cube in the present invention can also be used for recombining three different color beams to one single beam. Furthermore, the X-cube in the present invention also can be used for both light splitting and light recombination. The three intermediate parts, i.e. an intermediate part for color green 104a, an intermediate part for color red 104b and an intermediate part for colour blue 104c, are suited for receiving e.g. filters, analyzers or polarizers. Alternatively the present invention includes these intermediate parts being split in a different way and consisting of three separate pins or pillars. For each color, a spatial light modulating means 106a, 106b, 106c is provided which can be any suitable device which comprises an array of individually addressable and individually drivable light modulating pixels, which can be driven to represent an arbitrary image. The spatial light modulating can be e.g. a digital mirror device (dmd), a liquid crystal on silicon (LCOS) device, a liquid crystal display (lcd), but is not limited thereto. The light modulating means 106a, 106b, 106c can be either reflective or transmissive. The system has the strongest advantage for projectors using light modulating means with high resolution.

Accordingly, there is a spatial light modulating means for the green light 106a, a spatial light modulating means for the red light 106b and a spatial light modulating means for the blue light 106c.

It is a specific advantage of the present invention that the intermediate parts 104a, 104b, 104c are made of a specific material or materials. This material or these materials has/have a linear coefficient of thermal expansion or a combined average linear coefficient of thermal expansion which is the same or as close as possible to the linear coefficient of thermal expansion of the optical glass used for the X-cube 102 or to the linear coefficient of thermal expansion of the light modulating means 106a, 106b, 106c or to an average linear coefficient of thermal expansion of these means. The basic material typically is glass having a good transparency for light with wavelengths in the visible spectrum. The type of glass chosen for production of the light modulating means 106a, 106b, 106c can vary and depends on the quality of the light modulating means 106a, 106b, 106c used. Optical grade glass. BK7 as well as simple float glass without special characteristics can be used. The invention furthermore is not limited to light modulating means having glass as basic material. Other optical transparent materials such as sapphire or certain liquids also are within the scope of the present invention. By selecting intermediate parts 104a, 104b, 104c having an average linear coefficient of thermal expansion which is equal or close to the average linear coefficient of thermal expansion of the light modulating means 106a, 106b, 106c, tension and/or movement between the different components is avoided. The linear coefficient of thermal expansion should deviate not more than $3.10^{-6}$/K, preferably not more than $2.10^{-6}$/K, more preferably not more than $1.10^{-6}$/K from the linear coefficient of thermal expansion of all the other components that form the complete chain between each light modulating means and the used prism for recombining the at least 2 superposed images. This should preferably apply over the range 30° C. to +80° C., i.e. temperatures that are normal inside a projecting apparatus. These values should also be obtained for different humidity conditions, i.e. between 0% and 100% relative humidity. Furthermore, this material needs to have a similar specific heat capacity as the X-cube and the glass components of the light modulating means 106a, 106b, 106c, so that they have a similar behaviour even in gradient situations, i.e. also in non stable circumstances. The specific heat capacity should not deviate more than 200 J/(kg.K), preferably not more than 100 J/(kg.K), more preferably not more than 50 J/(kg.K). Preferably, the stiffness of the materials should also be larger than the stiffness of the materials currently used in conventional systems, i.e. better than the stiffness of metals or plastics, which might be filled. This can be expressed by its modulus of elasticity. This modulus of elasticity should be bigger than 100 GPa, preferably bigger than 200 GPa. Furthermore, the materials also should not suffer significantly from hysteresis or plastic deformation when stressed and behave fully elastic, i.e. come back to their original position when original environmental parameters are obtained. The latter elasticity should be obtained for deformation at temperatures that are between −30° C. and +80° C., i.e. temperatures that are normal inside a projecting apparatus. This elasticity should also be obtained for different humidity conditions, i.e. between 0% and 100% relative humidity. The most important environmental effects thus are variations in temperature and variations in humidity. These can cause mechanical stress in the materials. Examples of the materials which are suitable as construction material for intermediate parts are ceramics, e.g. $Al_2O_3$, as these have no plastic deformation when stressed, only a small amount of elastic deformation. $Al_2O_3$ also has the advantage that it can be shaped to functional parts with a limited amount of production time and costs. Other examples of ceramic materials that can be used are Zirconia, silicon nitride, boron carbide or silicon carbide. Alternative materials with similar linear expansion are e.g. glass as mentioned in Table 1, but also FeNi alloys and thermosetting material such as Bulk Molding Compound (BMC). The linear thermal expansion coefficient, the thermal conductivity and the Young modulus of some of these materials is shown in Table 1. The young modulus of BMC is not constant, but comparable to that of plastics such as Polyphenylene Sulphide.

TABLE 1

| Material | Linear expansion coefficient [/K] | Thermal conductivity [W/m.K] | Young modulus [GPa] |
| --- | --- | --- | --- |
| Aluminum | $2,4.10^{-8}$ | 220 | 70 |
| Steel | $1,2.10^{-5}$ | 46 | 210 |
| FeNi alloys | $<20.10^{-8}$ | 17 | 140 |
| Bulk Molding Compound (BMC) | $9.10^{-8} < \ldots <22.10^{-8}$ | 1 | Variable |
| Alumina | $6.2.10^{-8}$ | 7 | 360 |
| Optical glass | $5.10^{-8} < \ldots <8.10^{-8}$ | 1 | 58,8 |

In the above description reference has been made to a single material. Where mixtures of materials are used then the relevant values should be related to the combined effect of all the materials together, i.e. should relate to average values of thermal expansion coefficient, elasticity, etc.

Figure 2:
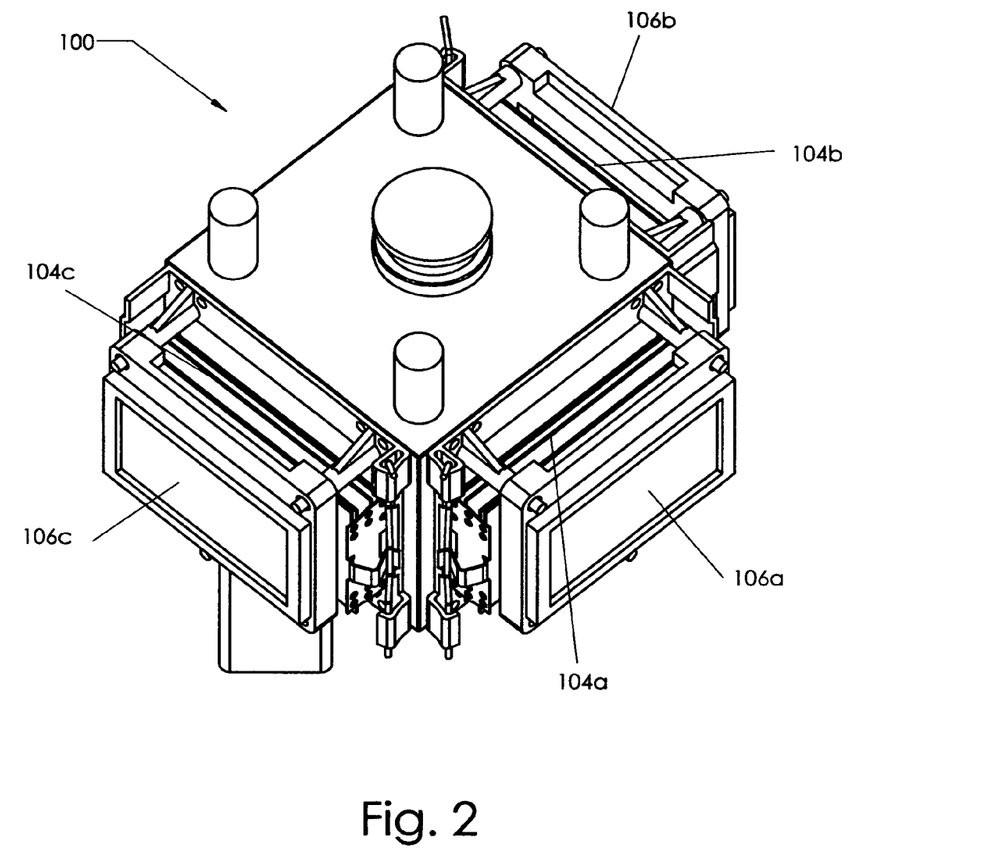
FIG. 2 shows an elevated top view of a convergence system according to the first embodiment of the present invention.

Each of the Intermediate parts 104a, 104b, 104c is fixed the x-cube 102 on one side and to the light valve means 106a, 106b, 106c of the corresponding color on the other side, e.g. by glueing. In the present invention, the glueing is performed with the least possible amount of play between glue 108 and parts, which is preferably below 0,4 mm, more preferably below 0,3 mm, most preferably below 0,2 mm. Glue 108 is used at different places with parameters, matching close with the parameters of all construction parts they connect. Examples of glues 108 that can be used are glues based on acrylate or epoxy that can quickly be cured with UV light or heat, or cements cured by heat. Ceramics and glass alternatively could be bonded together with solder and/or molten glass or other known principles. An alternative view on the convergence system is shown in FIG. 2.

Figure 3:
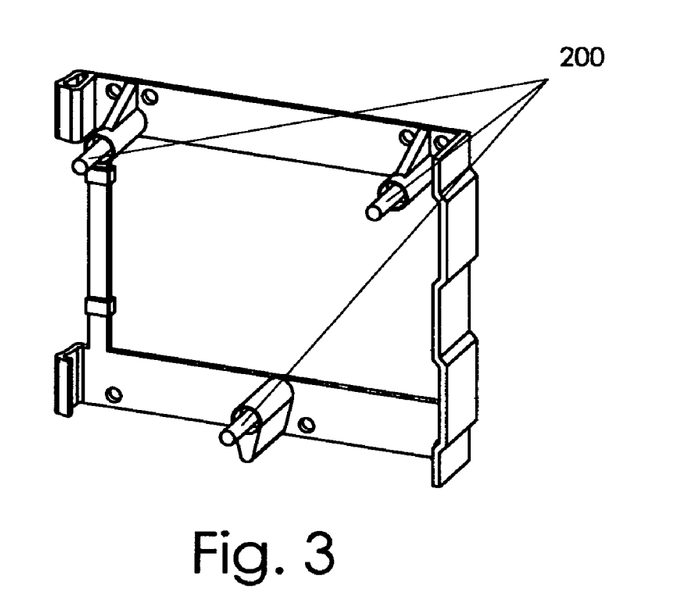
FIG. 3 shows a right-elevated top view of an intermediate part of a convergence system according to a second embodiment of the present invention.
Figure 4:
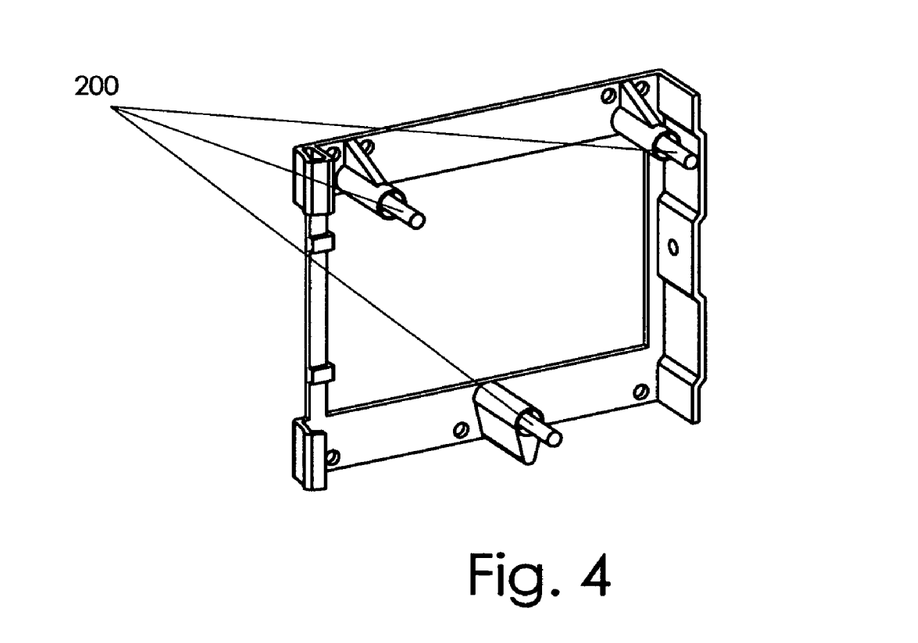
FIG. 4 shows a left-elevated top view of an intermediate part of a convergence system according to the second embodiment of the present invention.
Figure 5:
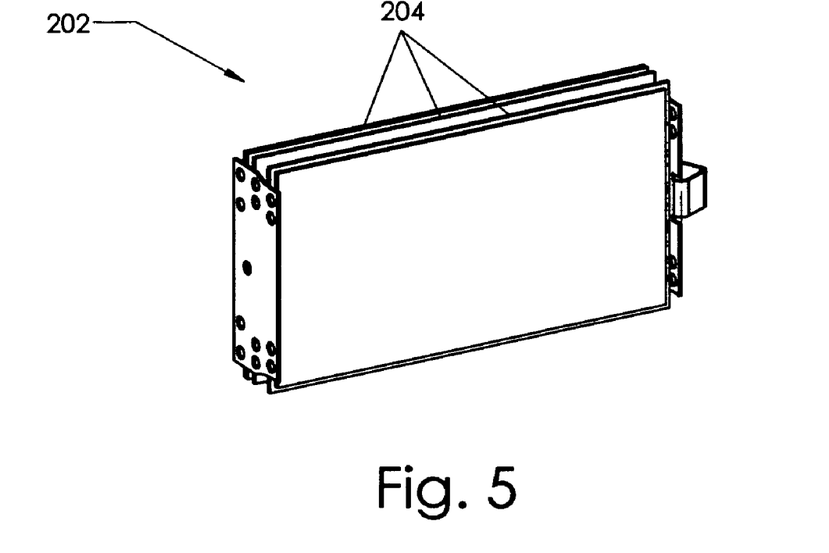
FIG. 5 shows a left elevated top view of an intermediate part with stiff bridges in a convergence system according to the second embodiment of the present invention.
Figure 6:
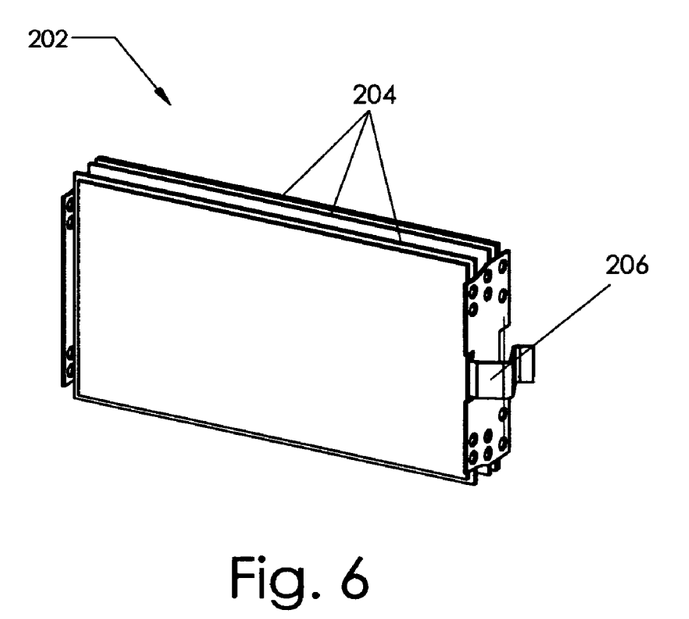
FIG. 6 shows a right-elevated top view of, an intermediate part with stiff bridges in a convergence system according to the second embodiment of the present invention.

In a second embodiment, a convergence system similar to that of the first embodiment of the present invention is used having three intermediate parts 104a, 104b, 104c, which have however, not only a straight but also a stiff construction. The intermediate parts 104a, 104b, 104c, are preferably made of a single part, or at least of the least possible numbers of parts. Therefore, the intermediate part is not only made of a stiff material, as discussed in the first embodiment, but also has a stiff construction. Straight, stiff bridges 200, as indicated in FIG. 3 and FIG. 4, are provided between the X-cube 102 and the spatial light modulating means 106a, 106b, 106c. FIG. 3 and FIG. 4 show a left elevated view and right elevated view of part of the intermediate part 104a, 104b, 104c. This stiff construction furthermore still allows guarding the possibility to adjust according to six degrees of freedom. These six degrees of freedom are not obtained by providing additional parts, but are provided inherently in the intermediate parts 104a, 104b, 104c. Three degrees of freedom, namely the rotations around the horizontal axis, i.e. the X-axis, and the vertical axis, i.e. the Y-axis, of a light modulating means 106a, 106b, 106c, together with the translation in the direction of the optical axis, i.e. the Z-axis, can be used to obtain a crisp image on the screen by providing a small amount of play between the three pins 200 and the three corresponding holes in the light modulating means 106a, 106b, 106c. The rotational movements can be used for controlling the sharpness and at the same time the magnification of the image, while the translational movement can be used for controlling the sharpness of the image. The three other degrees of freedom, namely the movements in the plane of the image, which consist of the vertical and the horizontal translation, together with the rotation in this plane, can be moved to obtain an image, well positioned vertically, horizontally and in rotation on the screen by sliding the intermediate play 104a, 104b, 104c against the dichroic prism, i.e. in this case the X-cube 102. By sliding, the play is also minimised. After positioning, all six degrees of freedom can be fixed with methods as formely described. This procedure can be repeated for each of the light modulating devices. From FIG. 3 and FIG. 4 it can be seen that the stiff bridges 200 will block an analyzer means in vertical direction. This means that using the conventional convergence systems, the analyzer means 202 could not be removed vertically anymore after construction of the convergence system, without removing the stiff bridges 200, i.e. breaking the connection between the light modulating means 106a, 106b, 106c and the X-cube 102. The present embodiment solves this problem by providing a way of removing the analyzer sideways. The analyzer means 202 and part of the intermediate parts is illustrated in FIG. 5 and FIG. 6, showing an elevated front and an elevated back view of the intermediate parts. The analyzer means 202, typically is a set of substrates 204, which can consist of 1, 2, 3 or more substrates 204. The analyzer means 202 and the different substrates 204 are fixed without play. This fixation may be performed by glueing. More preferably, the fixing means are such that the analyzer means 202 may be removably fixed. Such a fixing means may for example be a clamp 206 or a dosing means based on a spring. The sideways fixation thus allows removal of the analyzer if it reaches the end of its lifetime and provides the possibility for servicing both the analyzer means 202 and the convergence system 100.

It thus is a typical advantage of the present embodiment of the invention that it provides the possibility of sideways removal, servicing and replacement of the analyzers while still allowing a more stiff construction of the convergence system compared to conventional systems.

In a third embodiment, a convergence system similar to one of the convergence systems of the other embodiments of the present invention is described whereby the images on the screen are symmetric, i.e. so that the symmetry on the screen is kept. A first embodiment to obtain symmetry on the screen is by constructing the parts symmetrically, so that when they are subject of changes due to environmental effects, the shrinking or expansion is equal as well in the horizontal direction, i.e. the positive and negative x direction, as in the vertical direction, i.e. the positive and negative y direction. If this is done for each of the color beams, than the expansion or shrinking in e.g. the positive x direction will be equal for all colors and equal to the expansion or shrinking in e.g. the negative x direction. The same principle is valid for the y direction.

Figure 7:
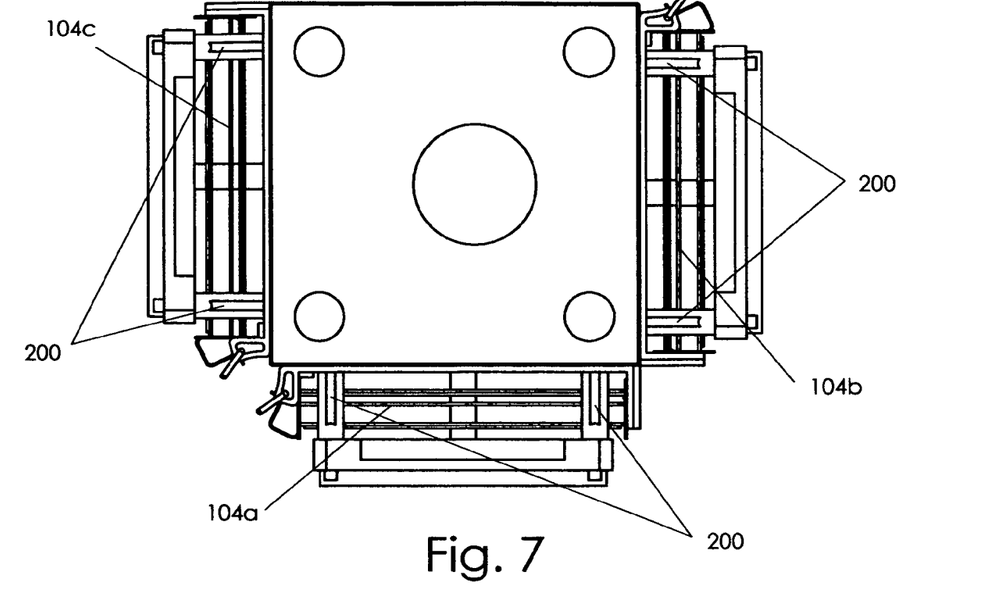
FIG. 7 shows a top view of a convergence system having asymmetrical intermediate parts according a third embodiment of the present invention.
Figure 8:
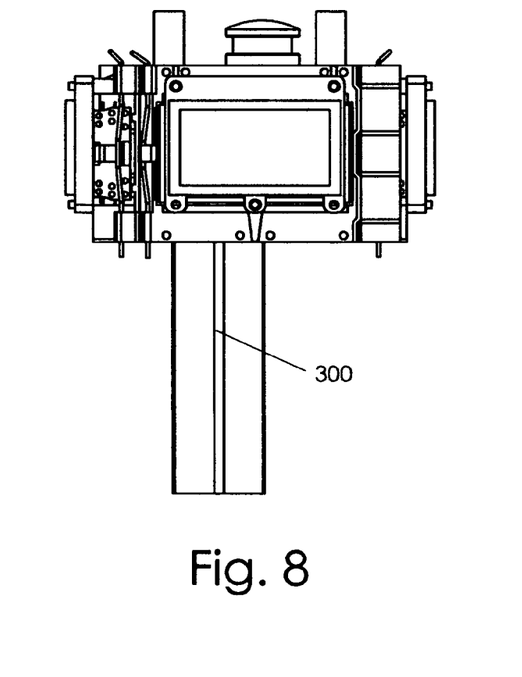
FIG. 8 shows a first side view of a convergence system having a handling means according to a fourth embodiment of the present invention.
Figure 9:
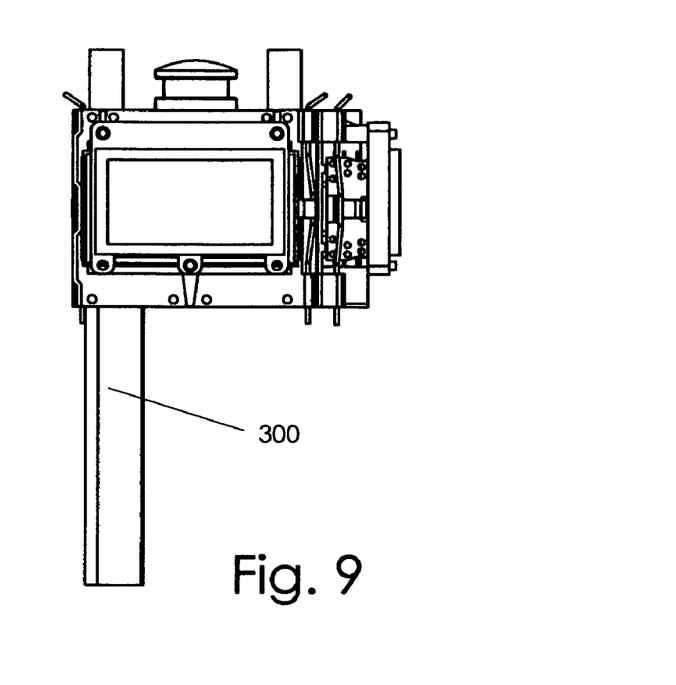
FIG. 9 shows a second side view of a convergence system having a handling means according to the fourth embodiment of the present invention.
Figure 10:
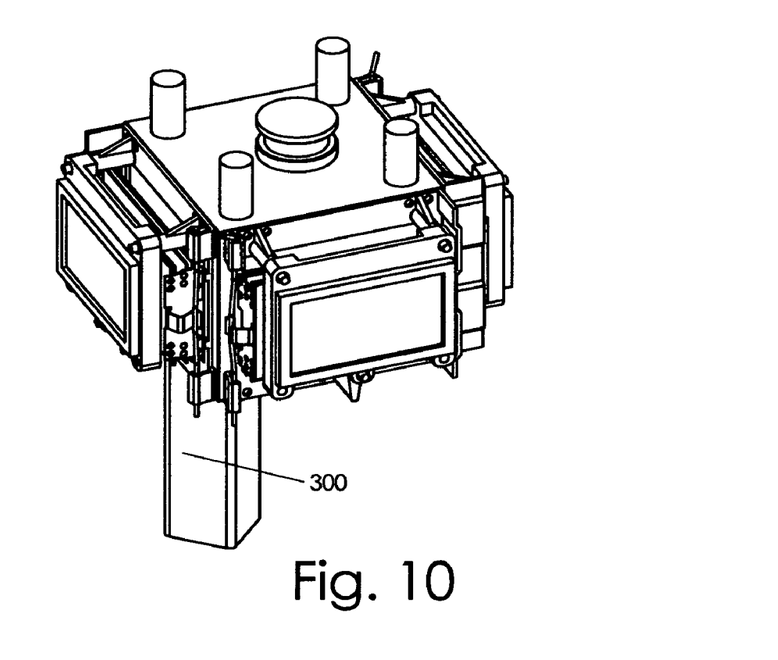
FIG. 10 shows a first elevated view of a convergence system having a handling means according to the fourth embodiment of the present invention.
Figure 11:
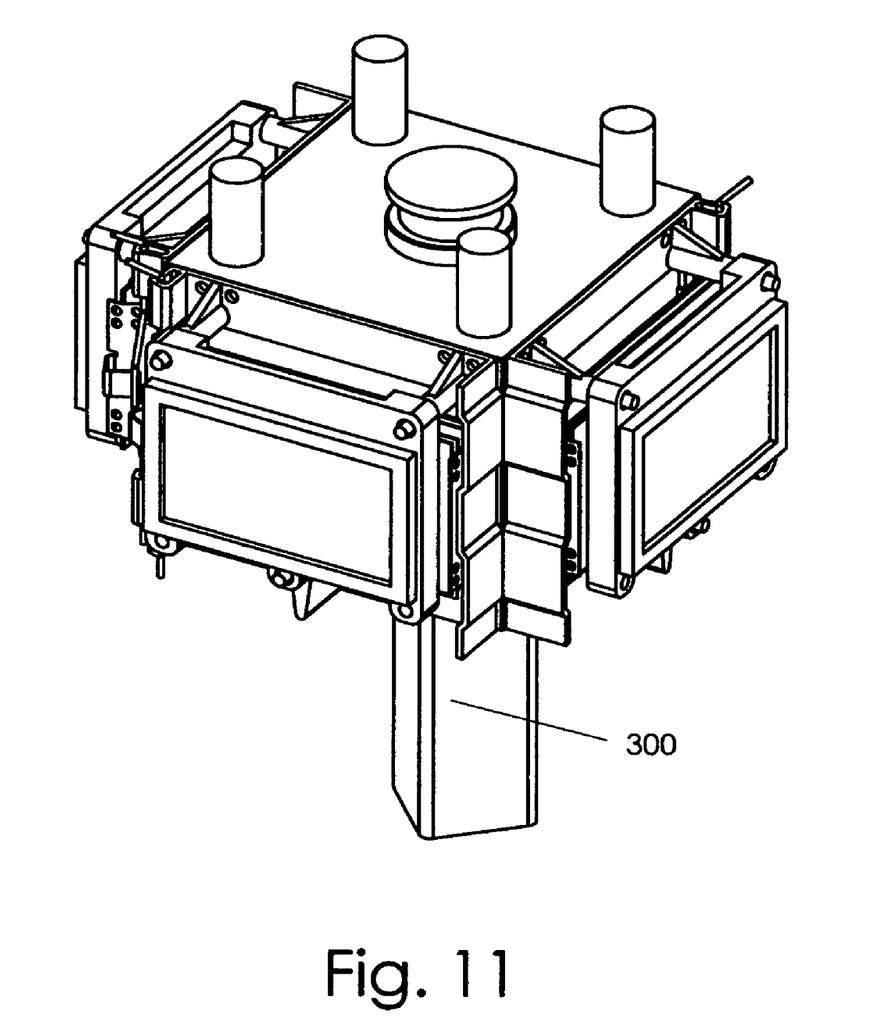
FIG. 11 shows a second elevated view of a convergence system having a handling means according to the fourth embodiment of the present invention.

A second embodiment of obtaining symmetrical behaviour on the screen is by mirroring parts that are not symmetrical for a specific color. For example, in the system shown in FIG. 7, the asymmetric part or all parts of the intermediate part that is positioned opposite to the entrance and/or exit side for the white beam, will be mirrored against the asymmetric part of the intermediate parts adjacent the entrance and exit side for the white beam. This is because a color light beam that is modulated by the intermediate part opposite to the entrance and/or exit side for the white beam is not reflected and thus not mirrored anymore by the X-cube dichroic mirror, while the color light beams modulated by intermediate parts adjacent to the entrance and/or exit side for the white beam are reflected and thus mirrored in the x-cube dichroic mirror, thereby providing a mirrored image on the screen. If thus an asymmetric shift occurs in the light modulating means due to environmental effects on asymmetric parts for the intermediate parts, the asymmetric shift will occur in the same direction for all colors on the screen, as the mirroring in the X-cube is compensated by mirroring the asymmetric parts in the intermediate parts 104a, 104b, 104c of the convergence system. For example, applied to the convergence system shown in FIG. 1, the green intermediate part 104a is mirrored against the red intermediate part 104b and blue intermediate part 104c to make that shift, if there already is any shift left, due to asymmetry of the Intermediate part 104a, 104b, 104c happens in the same direction on the screen for all three colors, hence without misconvergence. FIG. 7 shows a top view of the convergence system whereby mirrored asymmetrical parts are shown so that any drift caused by this, is mainly going in the same direction on the screen for all three main colors, hence have no relative convergence drift between the different colors.

In other words, according to the present embodiment of the invention, the shape of the intermediate parts is adjusted during construction such that a shift for the different color subimage projected on the screen caused by environmental influences on the intermediate parts, e.g. temperature, humidity, does not lead to a color misconvergence. A first way to do this is making the intermediate parts all symmetrical in a plane perpendicular to the optical axis of the intermediate parts, i.e. within a plane perpendicular to the direction along the light path, such that the expansion and reduction characteristics of all these parts is equal within this plane and the convergence of the different color subimages is independent of perturbations in one or more environmental factors which affect the dimensions of the intermediate parts. Again these environmental factors may be temperature, which could vary between −30° C. and +80° C., relative humidity, which could vary between 0% and 100%, stress, strain, etc. Preferably, the intermediate parts are not only symmetrical but also have the same size, i.e. their volume preferably differs less than 1%, more preferably less than 0.1%, even more preferably less than 0.01% and most preferably less than 0.001% from the volume of each of the other intermediate parts. In principle, the shape of the intermediate parts does not have to be cylindrical symmetrical, it only has to be symmetrical in the direction that is influenced by subsequent mirroring of the color subimages in the x-cube. In other words, if in the x-cube image points of the color subimages are switched from left to right in the image and vice versa, the symmetry in the intermediate part also needs to be in the left–right direction.

If asymmetrical shapes of the intermediate parts are used, but the color subimages resulting from the light modulating means connected to this intermediate parts are not mirrored anymore before they are projected on a screen, the shift induced by the intermediate parts due to perturbations in one or more environmental factors which affect the dimensions of the intermediate parts would be equal, in magnitude and direction, for all color subimages and thus not visible.

As an x-cube is used, some color subimages are mirrored while others are not. Therefore an asymmetric shape of the intermediate parts will, due to perturbations in one or more environmental factors, cause color misconvergences: e.g. a deformation of the color subimage formed by the light modulating means at the right side of the color subimage will for some color subimages, which are not mirrored, lead to a deformation at the right side of the color subimage in a projected image after the x-cube, and will for other color subimages, which are mirrored in the x-cube, lead to a deformation at the left side of the color subimage in a projected image after the x-cube. In the present embodiment of the invention, the intermediate parts are adjusted such that the color subimages on the screen will have the same deformation at the same spot in the projected subimages such that no color misconvergence is seen. For an x-cube mirroring e.g. a subimage in the left–right direction, i.e. where image points at the right side and image points at the left side of the image are switched during passing of the x-cube, the convergence system is adjusted such that the intermediate parts for subbeams that are mirrored in the x-cube, have a mirrored shape in the left–right direction compared to intermediate parts for subbeams that are not mirrored in the x-cube. The mirrored shape is such that it corrects for the color misconvergence due to mirroring of the subbeams in the x-cube. In other words, the number of times a subimage is mirrored after passing the light modulating means and before it is projected determines whether the intermediate parts has a first shape or the mirrored shape. More generally, either all intermediate parts sending a light subbeam to the light splitting and/or light recombining means that are subsequently mirrored an odd number of times before projection have a mirrored shape, or all the intermediate parts sending a light subbeam to the light splitting and/or light recombining means that are subsequently not mirrored or mirrored an even number of times have a mirrored shape. The mirroring of the shape of the intermediate part is performed with respect to a mirror plane defined by the optical axis of the system, i.e. the direction along the light path, and the direction in which the color subimages are left invariant by the x-cube.

In a further embodiment, a convergence system according to any of the previous embodiments of the present invention is provided, whereby furthermore a means 300 for handling the convergence system and for sliding the convergence system in a base plate or chassis of a projection system is provided. These means 300 are provided as convergence drift also can be caused by handling by movement of the panel or panel fixation parts due to touching of nearby parts or due to being stored in wrong position. The handling means 300, used for handling and guiding, typically comprise a grip and a guiding element. The guiding element preferably is a non-spherical element, as this allows providing a good orientation of the convergence system in the projection system. This guiding element may e.g. be a triangle tube, as shown in FIG. 8, FIG. 9, FIG. 10 and FIG. 11 whereof the bottom may be used to position and slide the convergence system in a triangular hole in the base plate of the projector or in the production tools during the production process. The same triangle tube can, at the other side, also be used as a grip to handle the assembly.

The present invention can be used in a projection display system. In such a projection display system a light beam of a light source will be focussed by optical components on a convergence system as described in any of the previous embodiments. The image formed in the convergence system then is projected on a screen with a projection lens. The projected imaged will be a scaled version of an image represented on the spatial light modulating means. The projection system furthermore also comprises a base plate for supporting the different components. The projection system has all advantages associated with the advantages of the convergence system.

The embodiments of the present invention have the advantages over the conventional systems that they provide convergence systems that are better fixed, stable over time ad not drifting due to environmental influences as mechanical stress, temperature and humidity. This is performed by combining better materials, in a stiffer construction with an on screen symmetrical behaviour and improved means for handling. The embodiments of the present invention thus act as much as possible as a solid block, i.e. monolithically. Furthermore, the embodiments of the present invention also act isotropically, i.e. the movements of the converged images for all tree colors are in the same directions. This is caused by constructing the convergence system, both for its chain of mainly mechanical parts and for the connection elements, e.g. such as glue, stable in the sub-micrometer range.

It is to be understood that although preferred embodiments, specific constructions and configurations, as well as materials, have been discussed herein for devices according to the present invention, various changes or modifications in form and detail may be made without departing from the scope and spirit of this invention. For example, although the embodiments are described for convergence systems having an x-cube, the embodiments also relate to e.g. the chain between an image modulator like e.g. a liquid crystal display, a digital mirror device, a liquid crystal on silicon device, and other prisms used in the image forming area, e.g. other color splitting and/or recombining prisms for lcd, dmd and lcos.

What is claimed is:

1. A convergence system for a projection display system, comprising a light splitting and/or light recombining means, a number of spatial light modulating means, and for each modulating means an intermediate part to connect said modulating means to a side of said light splitting and/or light recombining means, whereby each of said intermediate parts has an average expansion characteristic depending upon environmental influences which is similar to the average expansion characteristics depending upon environmental influences of at least one of the light splitting and/or recombining means and the light modulating means, wherein said convergence system has a color misconvergence drift due to said environmental influences which is less than 10 micrometers.

2. A convergence system according to claim 1, wherein said environmental influences are at least one of temperature, temperature gradient, humidity, stress and strain.

3. A convergence system according to claim 1, wherein said intermediate parts are at least partly constructed of ceramics.

4. A convergence system according to claim 3, wherein said intermediate parts are 100% constructed of ceramics at least 100% constructed of ceramics.

5. A convergence system according to claim 3 wherein said ceramic is $Al_2O_3$.

6. A convergence system according to claim 1, wherein each of the intermediate parts furthermore comprises straight, stiff bridges to connect the light splitting and/or light recombining means with the spatial light modulating means.

7. A convergence system according to claim 1, wherein each of the intermediate parts is adjusted for sideways receipt of analyzer means.

8. A convergence system according to claim 1, wherein the convergence system has six degrees of freedom for converging the different parts of the convergence system.

9. A convergence system according to claim 1, furthermore comprising connecting means to connect the intermediate parts with the light splitting and/or light recombining means and to connect the intermediate parts with the spatial light modulating means.

10. A convergence system according to claim 1, wherein the light splitting and/or light recombining means are an X-cube -dichroic prism.

11. A convergence system according to claim 1, the light splitting and/or light recombining means furthermore being adjusted to receive a light subbeam image from each set of spatial light modulating means and intermediate parts to form a converged image on a screen, the light splitting and/or light recombining means mirroring at least one of said light subbeam images, wherein at least one intermediate part has an asymmetric shape with respect to a direction perpendicular to an optical axis through the at least one intermediate part, and convergence of the subbeams after the light splitting and/or light recombining means before projection of the converged image on the screen is independent of perturbations in one or more environmental factors which affect the dimensions of the intermediate parts.

12. A convergence system according to claim 11, wherein the intermediate parts have an asymmetrical shape and whereby some intermediate parts are adjusted to have a mirrored asymmetrical shape compared to other intermediate parts, to provide isotropic misconvergence for each set of light modulating means and intermediate parts.

13. A convergence system according to claim 12, the light splitting and/or light recombining means adjusted to receive a light subbeam from each set of spatial light modulating means and intermediate parts, wherein said some intermediate parts are either all the intermediate parts sending a light subbeam to the light splitting and/or light recombining means that are subsequently mirrored an odd number of times by the light splitting and/or recombining means or all the intermediate parts sending a light subbeam to the light splitting and/or light recombining means that are subsequently not mirrored or mirrored an even number of times.

14. A convergence system according to claim 1, wherein the convergence system furthermore is provided with a handling and guiding means.

15. A projection display system comprising a convergence system according to claim 1.

* * * * *